UNITED STATES PATENT OFFICE.

WILLIAM G. COOPER, OF SAPULPA, OKLAHOMA.

COMPOSITION FOR APPLICATION TO RAZOR-STROPS.

1,344,865.  Specification of Letters Patent.  Patented June 29, 1920.

No Drawing.  Application filed July 21, 1919.  Serial No. 312,280.

*To all whom it may concern:*

Be it known that I, WILLIAM G. COOPER, a citizen of the United States, residing at Sapulpa, in the county of Creek and State of Oklahoma, have invented certain new and useful Improvements in Compositions for Application to Razor-Strops, of which the following is a specification.

The object of the present invention is to provide a composition of matter for application to razor strops and designed to facilitate sharpening of the razor.

The sharpening composition is prepared by mixing the following ingredients in about the proportions stated:

| | |
|---|---|
| Quicksand dust | 2 parts |
| Emery dust | 2 " |
| Venetian red | 1 " |
| Plaster cement | 1 " |

The said ingredients are thoroughly mixed together as stated and the composition may be applied to one face of a razor strop and will greatly facilitate sharpening of the razor, the other side of the strop being employed to give the razor a smooth edge.

It will be understood that the proportions of the ingredients constituting either composition may be varied if found desirable, as for example in accordance with the temper or condition of the razor to be sharpened.

Having thus described the invention, what is claimed as new is:

1. A composition for the purpose stated comprising quicksand dust, emery dust, Venetian red, and plaster cement.

2. A composition for the purpose stated comprising a mixture of quicksand dust two parts, emery dust two parts, Venetian red one part, and plaster cement one part.

In testimony whereof I affix my signature.

WILLIAM G. COOPER. [L. S.]